United States Patent
Hager et al.

(10) Patent No.: US 10,572,664 B2
(45) Date of Patent: Feb. 25, 2020

(54) TECHNIQUE FOR DETECTING SUSPICIOUS ELECTRONIC MESSAGES

(71) Applicant: retarus GmbH, Munich (DE)

(72) Inventors: Martin Hager, Munich (DE); Michael Grauvogl, Munich (DE)

(73) Assignee: retarus GmbH, Munich (DE)

( * ) Notice: Subject to any disclaimer, the term of this patent is extended or adjusted under 35 U.S.C. 154(b) by 109 days.

(21) Appl. No.: 15/706,796

(22) Filed: Sep. 18, 2017

(65) Prior Publication Data

US 2018/0082062 A1    Mar. 22, 2018

(30) Foreign Application Priority Data

Sep. 19, 2016  (EP) ..................................... 16189472

(51) Int. Cl.
*G08B 23/00* (2006.01)
*G06F 21/56* (2013.01)
(Continued)

(52) U.S. Cl.
CPC ............ *G06F 21/564* (2013.01); *H04L 51/12* (2013.01); *H04L 63/123* (2013.01);
(Continued)

(58) Field of Classification Search
CPC ..... G06F 21/56; G06F 21/565; H04L 63/1408
(Continued)

(56) References Cited

U.S. PATENT DOCUMENTS 7,694,150 B1    4/2010 Kirby
7,870,205 B2 *  1/2011 LeVasseur ............ H04L 63/126
                                                     709/206

(Continued)

FOREIGN PATENT DOCUMENTS

KR    20100074480 A    7/2010
KR    20140127036 A    11/2014

OTHER PUBLICATIONS

Agarwal et al, Robust Data Leakage and Email Filtering System, 2012, IEEE, pp. 1032-1035.*

(Continued)

*Primary Examiner* — Luu T Pham
*Assistant Examiner* — Jenise E Jackson
(74) *Attorney, Agent, or Firm* — Bachman & LaPointe, PC

(57) ABSTRACT

The disclosure relates to a method of detecting suspicious electronic messages. The method is performed in a messaging server which is in communication with a plurality of message senders and a plurality of message receivers, and comprises the steps of: receiving electronic messages sent from the plurality of message senders to at least one message receiver; extracting from each received message at least one message sender feature and at least one message content feature; recording the extracted message sender features and message content features in a database; determining, on the basis of the message content features recorded in the database, whether a specific content feature that can be associated with a current message has already been recorded in the past; if the specific content feature has already been recorded in the past, determining, on the basis of the message sender features recorded in the database, a number of message senders that can be associated with the specific content feature; and classifying the current message as suspicious if the determined number of message senders that can be associated with the specific content feature exceeds a predetermined threshold value. Also disclosed is a messaging server implementing the above described method.

14 Claims, 5 Drawing Sheets

(51) Int. Cl.
*H04L 29/06* (2006.01)
*H04L 12/58* (2006.01)

(52) U.S. Cl.
CPC ........ *H04L 63/1416* (2013.01); *H04L 63/164* (2013.01); *H04L 63/145* (2013.01); *H04L 63/1408* (2013.01); *H04L 63/308* (2013.01); *H04L 2463/121* (2013.01); *H04L 2463/144* (2013.01)

(58) Field of Classification Search
USPC .......................................................... 726/24
See application file for complete search history.

(56) References Cited

U.S. PATENT DOCUMENTS

| | | | | |
|---|---|---|---|---|
| 8,204,945 | B2* | 6/2012 | Milliken | G06F 21/562 709/206 |
| 2004/0215977 | A1* | 10/2004 | Goodman | G06Q 10/107 726/22 |
| 2004/0260922 | A1 | 12/2004 | Goodman et al. | |
| 2005/0283837 | A1* | 12/2005 | Olivier | G06F 21/56 726/24 |
| 2009/0026578 | A1 | 10/2009 | Xie et al. | |
| 2009/0265786 | A1 | 10/2009 | Xie et al. | |
| 2010/0161734 | A1* | 6/2010 | Wang | H04L 51/12 709/206 |
| 2010/0205265 | A1* | 8/2010 | Milliken | G06F 21/562 709/206 |
| 2011/0138041 | A1* | 6/2011 | Petry | G06Q 20/102 709/224 |
| 2011/0179487 | A1* | 7/2011 | Lee | H04L 51/12 726/23 |
| 2011/0314546 | A1 | 12/2011 | Aziz et al. | |
| 2012/0260340 | A1* | 10/2012 | Morris | G06F 21/56 726/23 |

OTHER PUBLICATIONS

Du et al, Research of the Anti-Phishing Technology Baseed on E-mail Extraction and Analysis, 2014, IEEE, pp. 60-65.*
Xie et al., "Spamming Botnets: Signatures and Characteristics", Sigcomm '08 Proceedings, ACM, Seattle, Washington, US, Aug. 17, 2008, pp. 171-182.
Surwade et al., "Effective and Adaptive Technological Solution to block Spam E-mails", International Conference on Advances in Human Machine Interaction Mar. 3, 2016, pp. 1-10.
European search report for patent application No. 16 189 472.0 dated Dec. 15, 2016.
Korean office action for patent application No. 10-2017-0114995 dated Jan. 10, 2019.
Korean office action for patent application No. 10-2017-0114995 dated Sep. 25, 2019.

* cited by examiner

TECHNIQUE FOR DETECTING SUSPICIOUS ELECTRONIC MESSAGES

TECHNICAL FIELD

The present disclosure relates generally to security aspects in information technology. In particular, the disclosure relates to a technique of detecting malicious electronic messages.

BACKGROUND

Electronic messages, such as electronic mail messages (or in short e-mails), instant messages, electronic fax messages and so on, are frequently used for spreading malware or spam over a large number of networked computer devices. In this context, the term "malware" or "malicious software" refers to any software or software portions used to disrupt computer operations, data sensitive information, or gain access to private or corporate computer systems. Malware embedded in or attached to electronic messages and distributed via electronic messages can include, amongst others, viruses, worms, Trojan horses, ransomware, scare-ware, adware and/or other malicious programs. The term "spam" refers to unsolicited messages which are sent to a large number of message receivers and which usually contain unwanted advertising content or other type of junk content not solicited by users.

Spam messages, such as spam mails, are often sent by botnets or "zombie networks." A botnet or zombie network is a network of infected computer devices which can be accessed and used by hackers for malicious purposes. For instance, botnet computer devices can be used by hackers for performing spam attacks in an anonymous way or for participating in distributed denial-of-service attacks. Since such attacks originate from many distributed infected computers, but not from the original hacker, it is difficult to identify and bring under control such attacks. In practice, it takes some time until conventional antimalware systems or spam filters are capable to detect such botnets attacks. However, the more time passes, the more spam messages or malicious content can spread over the internet and infect computers.

US 2009/0265786 A1 describes an automatic botnet spam signature generation technique on the basis of a set of unlabeled emails. The technique works as follows: a set of unlabeled emails is used as input and the URLs contained in the set of emails are extracted and grouped into a plurality of URL groups according to their domains. Thereafter the generated URL groups are analyzed in order to determine which group best characterizes an underlying botnet. The URL group which best represents the characteristics of a botnet (that is, which exhibits the strongest temporal correlation across a large set of distributed senders) is selected.

Accordingly, there is a need for a new detection technique capable of detecting suspicious or malicious electronic messages in communications networks in a fast and efficient way.

SUMMARY

According to a first aspect, a method of detecting suspicious electronic messages is provided, wherein the method is performed in a messaging server which is in communication with a plurality of message senders and a plurality of message receivers. The method comprises the steps of: receiving electronic messages sent from the plurality of message senders to at least one message receiver; extracting from each received message at least one message sender feature and at least one message content feature; recording the extracted at least one message sender features and at least one message content features in a database; determining, on the basis of the message content features recorded in the database, whether a specific content feature that can be associated with a current message has already been recorded in the past;

if the specific content feature has already been recorded in the past, determining, on the basis of the message sender features recorded in the database, a number of message senders that can be associated with the specific content feature; and classifying the current message as suspicious if the determined number of message senders that can be associated with the specific content feature exceeds a predetermined threshold value.

In the present disclosure, the term "electronic message" (or abbreviated "message") may have been construed broadly. As "electronic message" or "message" any digital data item or any digital data portion may be meant which contains a message in the form of symbols, alphabetic and/or numerical characters, graphical elements, and so on, and which can be used for embedding or spreading spam content or malware. For instance, as electronic message an electronic mail message, an instant message, or an electronic fax message may be meant.

Further, with "message sender" or "message senders" any electronic device or devices may be meant which are configured to send electronic messages, such as smartphones, tablets, personal computers, and/or any other private or corporate computer devices. The at least one "message receiver" may be any device configured to receive electronic messages, such as a smartphone, tablet, personal computer, and/or any other private or corporate computer device.

Still further, messages that are most likely spam messages or malicious messages are referred to as "suspicious messages". Depending on the frequency of occurrence and the content of the transmitted messages, messages are regarded as spam messages or malicious messages. According to the present invention, the frequency of occurrence of different message contents within a flow of messages from a plurality of message senders to a plurality of message receivers is detected in order to estimate whether specific message contents are spam and/or malicious.

The method may further comprise: generating a timestamp for each extracted message sender feature and message content feature and recording the timestamp along with the extracted message sender feature and message content feature in the database. The generated timestamp may be indicative of a time at which the extracted message sender feature and the extracted message content feature carried by one or more electronic messages occur at the messaging server. By recording the extracted message sender features and the extracted message content features along with corresponding timestamps it is possible to track a temporal occurrence of content features (i.e., a temporal occurrence pattern) in conjunction with different message senders for specific time intervals in the past.

The step of recording message sender features and message content features may further comprise organizing the time-stamped message sender features and message content features into at least one index data structure. A plurality of identical message sender features and a plurality of identical message content features having allocated the same time stamp may be recorded only once in the index data structure. According to one implementation the time-stamped message sender features and message content features may be recorded in two separate index data structures. A first index data structure may comprise a data set of time-stamped message content features, and a second index data structure may comprise a data set of time-stamped message content features and message address features.

In order to determine whether a specific content feature extracted from a current message is already available in the database, an identity or similarity check between the specific content feature associated with the current message and the recorded content features in the database is performed. The identity or similarity check may comprise looking up for identical or similar content feature records in the database. If the database comprises two index data structures as described above, a look-up for at least one identical or similar content feature in the first index data structure may be performed. The look-up for identical or similar content feature records in the database may be limited to content feature records associated with a predetermined time window in the past. In the following, this time window is called look-up detection window. The look-up detection window may be limited to the last few hours.

The step of determining a number of message senders that can be associated with the specific content feature may comprise looking up for message sender features in the database that can be related to the specific content feature. If the database comprises two index data structures as described above, the lookup for message sender features may be performed in the second index data structure. Again, the look-up in the database may be limited to message sender feature records within the predetermined look-up detection window. As the message sender feature records are indicative of the message senders, it can be easily derived from the found message sender feature records how many message senders have sent the same or similar message content. In case the determined number of message senders exceeds the predetermined threshold value, it can be assumed with a certain likelihood that the content is spam content or malicious content originating from botnets.

The predetermined threshold value may be preset or dynamically adjusted. The adjustment of the predetermined threshold value may depend on the chosen look-up detection window and/or the specific content feature for which the message senders are to be determined. The threshold value may be set or adjusted according to a statistical significance level. That is, the threshold value may be set such that a probability of erroneously classifying spam content or malicious content as clean content is lower than 5%, preferably lower than 1%.

The classifying step may further comprise at least one of the following processes: tagging the current message as suspicious message; and registering the content as suspicious or malicious content in a blacklist.

After classifying the current message as suspicious, according to one implementation variant, the method may further comprise: blocking the current message; quarantining the current message; and/or subjecting the current message to an AV analysis. In case the AV analysis determines that the suspicious message can be considered to be clean, the message will be routed to the intended message receiver.

The extracted message sender feature may be indicative of an address or address portion of the message sender. Hence, the extracted message sender feature can be used for identifying the sender of a message. According to one variant, the extract message sender feature may be a hash value of the sender address or portions thereof.

The message content feature may be indicative of an attachment of the message, subject line content of the message, URL or URL portions comprised in the message and/or other content embedded in the message. Hence, the extracted message content feature can be used for identifying the content of a message. According to one variant, the message content feature may be a hash value of the attachment of the message, subject line content of the message, URL or URL portions comprised in the message and/or of other content embedded in the message.

According to a second aspect, a computer program product with program code portions is provided for carrying out the above described method when the computer program product is executed on a computer device (e.g. a messaging server). The computer program product may be stored on a (non-transitory) computer-readable recording medium.

According to a third aspect, a messaging server for detecting suspicious electronic messages is provided, wherein the messaging server is in communication with a plurality of message senders and a plurality of message receivers. The messaging server is configured to receive electronic messages sent from the plurality of message senders to at least one message receiver and comprises: an analysing unit configured to extract at least one message sender feature and at least one message content feature from each received message; a recording unit configured to record the extracted at least one message sender features and at least one message content features in a database; a determining unit configured to determine, on the basis of the message content features recorded in the database, whether a specific content feature that can be associated with a current message has already been recorded in the past, and if the specific content feature has already been recorded in the past, to further determine, on the basis of the message sender features recorded in the database, a number of message senders that can be associated with the specific content feature; and a classifying unit configured to classify the current message as suspicious if the determined number of message senders that can be associated with the specific content feature exceeds a predetermined threshold value.

The messaging server may further comprise a time-stamping unit configured to provide a digital timestamp for each extracted message sender feature and message content feature.

The messaging server may further comprise a data storage configured to store the database.

The messaging server may be implemented as a single computer device or a computer system comprising distributed computer devices which are configured to carry out the above-described method.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented herein. It will be apparent to one skilled in the art that the disclosed technique may be practised in other embodiments that depart from these specific details.

Figure 1:
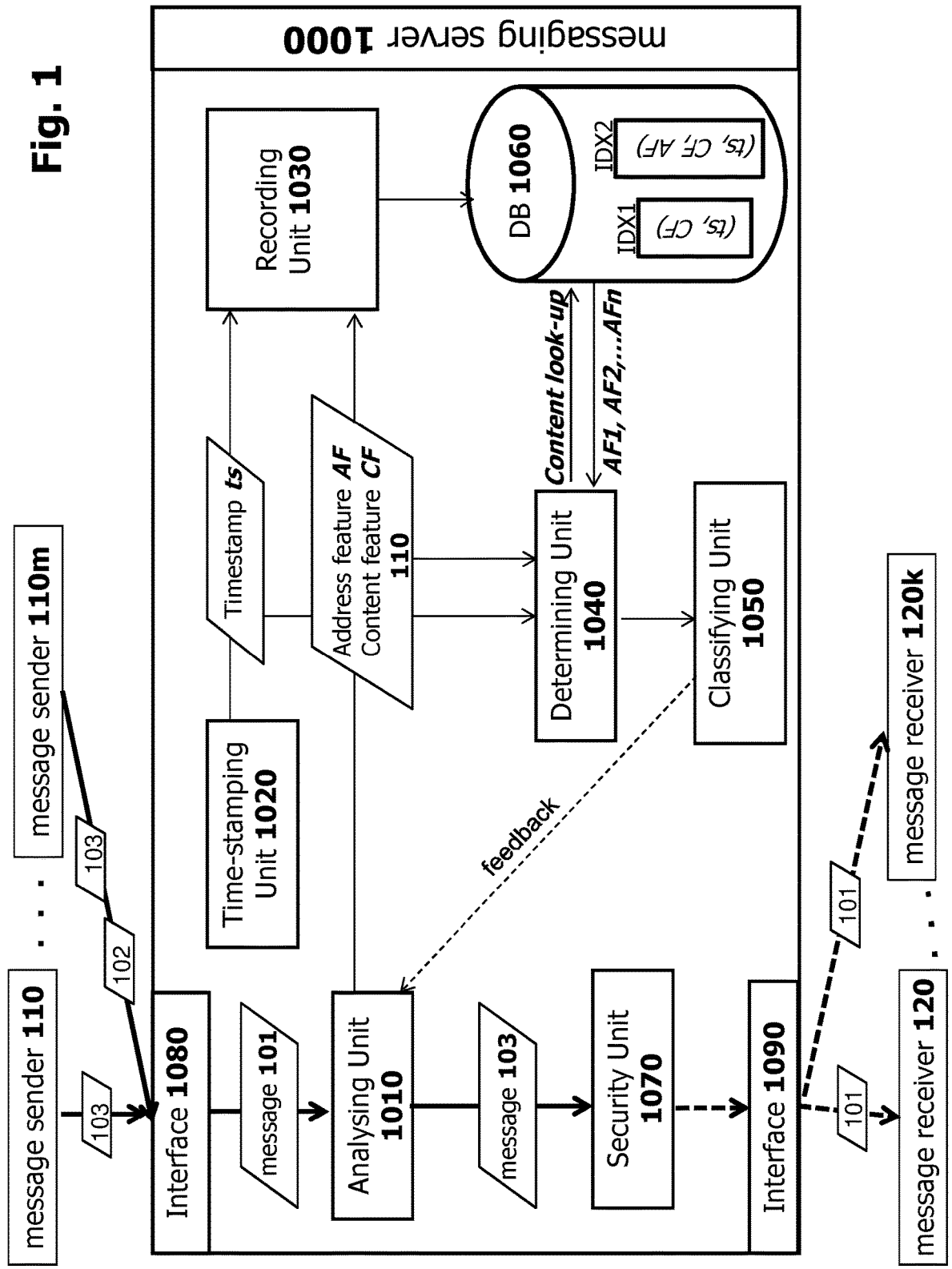
FIG. 1 is a block diagram illustrating a messaging server configured to detect suspicious electronic messages according to an exemplary embodiment of the present invention.

FIG. 1 illustrates, in the form of a block diagram, an exemplary embodiment of a messaging server 1000 which is designed to implement the below described technique for detecting suspicious electronic messages.

Messages that are most likely spam messages or malicious messages are referred to as suspicious messages hereinafter. Depending on the frequency of occurrence and the content of the transmitted messages, messages are regarded as spam messages or malicious messages. As will be further discussed below, the messaging server 1000 is designed to evaluate the frequency of occurrence of different message contents within a flow of messages from a plurality of message senders 110-110m to a plurality of message receivers 120-120k in order to estimate whether specific message contents are spam and/or malicious.

As is illustrated in FIG. 1, the messaging server 1000 is in communication with a plurality of message senders 110-110m and a plurality of message receivers 120-120k which are part of a communications network (such as the internet). It is noted that in FIG. 1 only the message senders 110 and 110m are shown in order to indicate that m different message senders 110-110m may be available in the network for transmitting an arbitrary number of messages 101, 102, 103 to the messaging server 1000, wherein m is an integer greater than or equal to 2. Likewise, FIG. 1 only illustrates the message receivers 120 and 120k. However it is clear that k different message receivers may be in communication with the messaging server 1000 for receiving the messages 101, 102, 103 sent by the plurality of message senders 110-110m, wherein k is an integer greater than or equal to 2. The message senders 110-110m and the message receivers 120-120k may each be realized in the form of electronic devices capable of sending/receiving electronic messages 101, 102, 103, such as portable user terminals (such as PDAs, cell phones, smartphones, notebooks) or fixed computer devices.

The messaging server 1000 is designed to continuously receive electronic messages 101, 102, 103 sent from the message senders 110-110m and to route the received messages 101, 102, 103 to the intended message receivers 120-120k. Hence, there is a continuous flow of messages 101, 102, 103 from the plurality of message senders 110-110m through the messaging server 1000 to the plurality of message receivers 120-120k. This flow is indicated by bold arrows in FIG. 1. Since the messaging server 1000 is configured to analyze incoming messages 101, 102, 103 with regard to spam and malicious behaviour, it is clear that not every incoming message 101, 102, 103 is routed to the intended message receivers 120-120k. Rather, messages 101, 102, 103 which are found to be malicious or which can clearly be regarded as spam messages may be filtered out and not be sent to the corresponding message receivers 120-120k. The filtering behaviour of the messaging server 1000 is indicated by dashed arrows in FIG. 1.

Still with reference to FIG. 1, the structure and functionality of the messaging server 1000 is further described. The messaging server 1000 comprises an analysing unit 1010, a time-stamping unit 1020, a recording unit 1030, a determining unit 1040, a classifying unit 1050 and a database 1060. Further, the messaging server 1000 comprises a first interface 1080 and a second interface 1090. Optionally, the messaging server 1000 may comprise a security unit 1070. As is illustrated in FIG. 1, the units 1010 to 1070 are in communication with each other and with the interfaces 1080 and 1090.

Each of the analysing unit 1010, stamping unit 1020, recording unit 1030, determining unit 1040, classifying unit 1050 and the security unit 1070 can be implemented as a separate software module, hardware module or a combined software/hardware module. Alternatively, the analysing unit 1010, time-stamping unit 1020, recording unit 1030, determining unit 1040 and classifying unit 1050 can also be implemented as sub-modules of a commonly designed software and/or hardware module. One skilled in the art will appreciate that the above-mentioned units may be implemented using software functioning in conjunction with a program microprocessor, an application-specific integrated circuit (ASIC), a digital signal processor (DSP), or a general purpose computer.

The first communication interface 1080 is configured to receive electronic messages 101, 102, 103 from the message senders 110-110m and to provide the received messages 101, 102, 103 to the analysing unit 1010. Further, the second communication interface 1090 is configured to transmit messages 101, 102, 103 which are received by the messaging server 1000 and not blocked by the messaging server 1000 to the destined message receivers 120-120k. Both communication interfaces 1080, 1090 can be implemented in the form of a wireless communication interface (for instance, a radio transmission interface) and/or a wired communication interface, depending on how the message communication between the message senders 110-110m and the messaging server 1000 on the one hand and the message receivers 120-120k and the messaging server 1000 on the other hand are implemented.

According to another variant, the first and second interfaces 1080, 1090 can also be realized as a single common interface, which is designed to communicate with the environment (i.e., with the message senders 110-110m and the message receivers 120-120k).

The security unit 1070 may comprise an anti-virus analysis module (AV analysis module), which is configured to provide an anti-virus analysis (AV analysis) for each electronic message 101, 102, 103 received by the messaging server 1000. As AV analysis module any commercially available AV analysis module can be used which is designed to at least perform signature scans for the messages 101, 102, 103 on the basis of known signatures stored in blacklists and whitelists. Beside a signature matching the AV analysis module may also implement heuristic anti-virus detection techniques and/or emulation techniques for detecting malicious behaviour of messages 101, 102, 103. The AV analysis module is further configured to filter out and block messages 101, 102, 103 which are found to comprise malicious content.

Additionally, the security unit 1070 may comprise at least one spam filter which is configured to filter out spam messages. Hence, the security unit 1070 is configured to block spam messages and malicious messages and to let pass only those messages which are found to be not malicious or spam messages.

The analysing unit 1010 is in communication with the first interface 1080. The analysing unit 1010 is designed to intercept the incoming messages 101, 102, 103 received from the first interface 1080 and to analyse the incoming messages 101, 102, 103 with regard to their content. That is, the analysing unit 1010 is designed to extract for each message 101, 102, 103 at least one message content feature CF which can be associated with the specific content carried by the message 101, 102, 103. The extracted message content feature CF may be indicative of at least one of a subject line content of the message 101, 102, 103, message content attached to or embedded in the message 101, 102, 103 and portions thereof. Such message content may comprise, for instance, message attachments or URLs comprised in the message.

Further, the analysing unit 1010 is configured to additionally extract a message sender feature from each received message 101, 102, 103. The message sender feature may be an address feature AF indicative of the address or address portions of the message sender 110-110m, from which the message 101, 102, 103 originates. Content features CFs and address features AF can be provided as hash values. For instance, the content features CFs and address features AFs may each be provided as MD5 hash values.

The time-stamping unit 1020 is configured to generate and provide a timestamp for each message 101, 102, 103. The timestamps are provided with a predetermined time accuracy. For instance, time accuracies in the range of 1 sec to 60 sec, preferably of 5 sec to 10 sec, more preferably of 10 sec, are conceivable. Each provided timestamp is indicative of a point of time at which a considered message 101, 102, 103 (and consequently the address feature AF and content feature CF extracted from the considered message 101, 102, 103) occurs in the messaging server 1000. Extracted content and address features, which can be associated with messages received within the predetermined timestamp accuracy range, are provided with the same timestamp ts.

The recording unit 1030 is in communication with the time-stamping unit 1020 and the analysing unit 1010. The recording unit 1030 receives for each message 101, 102, 103 analysed by the analysing unit 1010 corresponding address and content features AFs, CFs as well as a corresponding timestamp ts. The recording unit 1030 is configured to record address and content features along with a corresponding timestamp in the database 1060. Thus, for each received message 101, 102, 103 a unique set of related data (ts, CF, AF) which comprises a timestamp ts, a content feature CF and a related address feature AF is recorded in the database 1060. In order to improve database performance, only sets of data (ts, CF, AV) which differ at least in one feature (that is, either in the address feature AF, content feature CF or timestamp ts) are recorded in the database 1060. That is, different sets of data that are extracted from different messages 101, 102, 103, but reveal the identical set of content feature CF, address feature AF and timestamp ts (i.e., extracted sets with the same feature combination) are only recorded once in the database 1060. It is noted that it is not unlikely to extract sets of data from different messages 101, 102, 103 having the identical feature combination. For instance, newsletters which originate from the same message sender 110-110m and carry the same message content in each message may lead to identical feature combination (ts, CF, AF).

According to one implementation illustrated in FIG. 1, the recording unit 1030 is designed to record the received address features AFs, content features CFs and associated timestamps ts into two separate index data structures. In a first index data structure IDX1 the time-stamped content features (ts, CF) are recorded, while in a second index data structure IDX2 the time-stamped content features along with the address features (ts, CF, AF) are recorded. Again, for the purpose of improving database performance, repeating sets of data (ts, CF) and (ts, CF, AF) are only recorded once in the corresponding index data structures IDX1 and IDX2. The advantages of such a data structuring will be discussed in conjunction with FIGS. 2a-2c below.

The determining unit 1040 is in communication with the analysing unit 1010. The determining unit 1040 is configured to receive from the analysing unit 1010 the content features CFs (and optionally the address features AFs) extracted from the messages 101, 102, 103. Moreover, the determining unit 1040 may receive timestamps ts generated for the extracted content features CFs. The determining unit 1040 is further configured to determine for each specific content feature CF extracted from a currently received message (for instance, message 101 in FIG. 1) whether this content feature CF has already been recorded in the database 1060 in conjunction with a plurality of different address features AFs in the past. Since the database 1060 comprises sets of correlated address features AFs and content features CFs of previously received messages, a database look-up enables a determination of all (or at least a portion of) previously recorded address features AFs which can be associated with the specific content feature CF. From the address features AFs, in turn, it is possible to identify the message senders 110-110m which have transmitted the same specific content in the past. Since attacks from botnets are characterized by large numbers of messages transmitted by a plurality of different message senders 110-110m over a short period of time, it is sufficient to limit the determining of different address features AFs to a short look-up detection window. For instance, a look-up detection window may be preset which covers the last 10 hours, preferably the last 5 hours, more preferably the last hour from now.

The classifying unit 1050 is configured to receive the different address features AFs determined by the determining unit 1040 and to derive therefrom a number N of different message senders 110-100m that can be associated with the specific message content feature CF. If this number exceeds a predetermined threshold number, the classifying unit 1050 classifies the current message as suspicious.

Figure 2A:
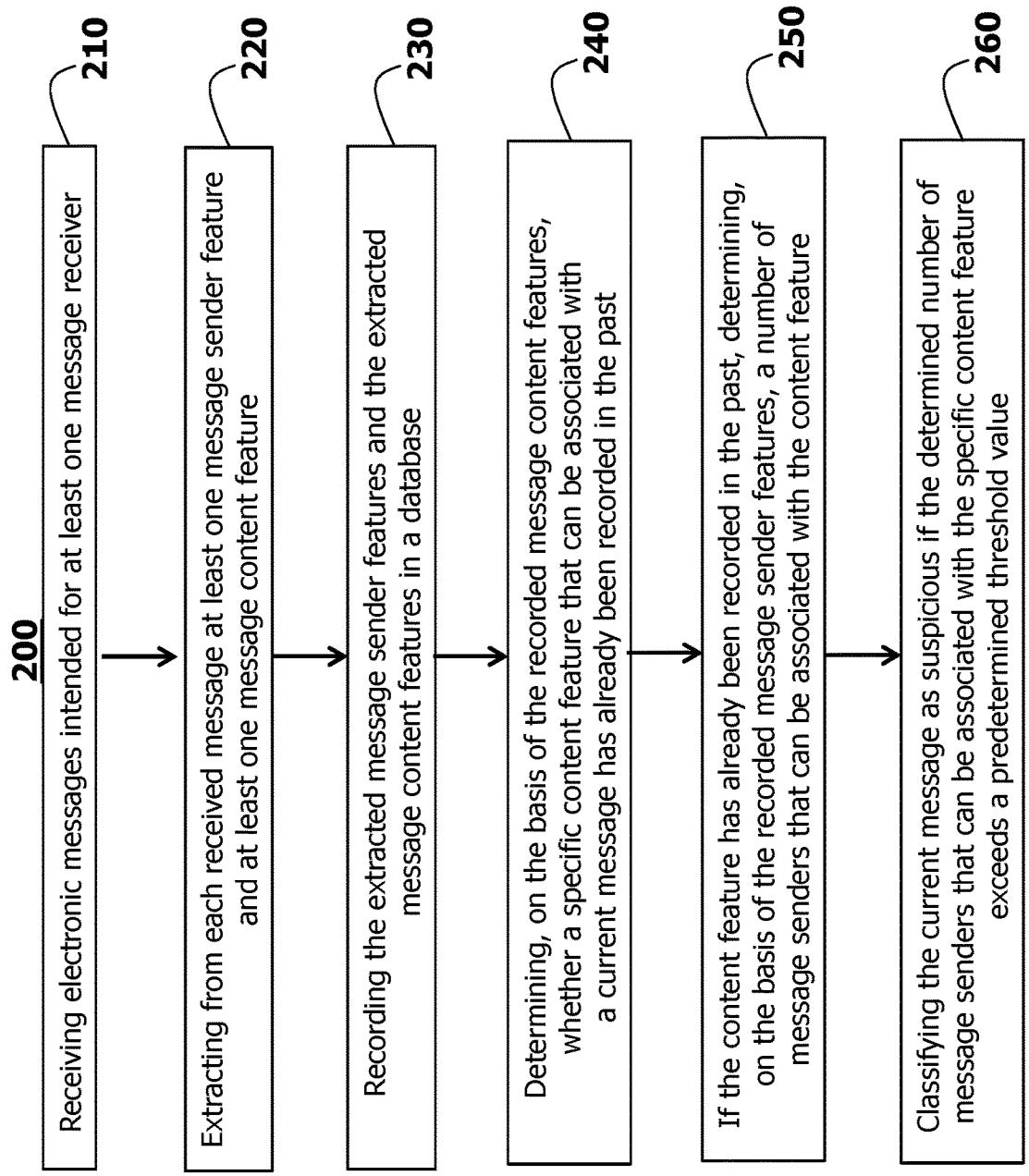
FIG. 2a-2c are flow diagrams illustrating a method of detecting suspicious electronic messages according to an exemplary embodiment of the present invention.
Figure 2B:
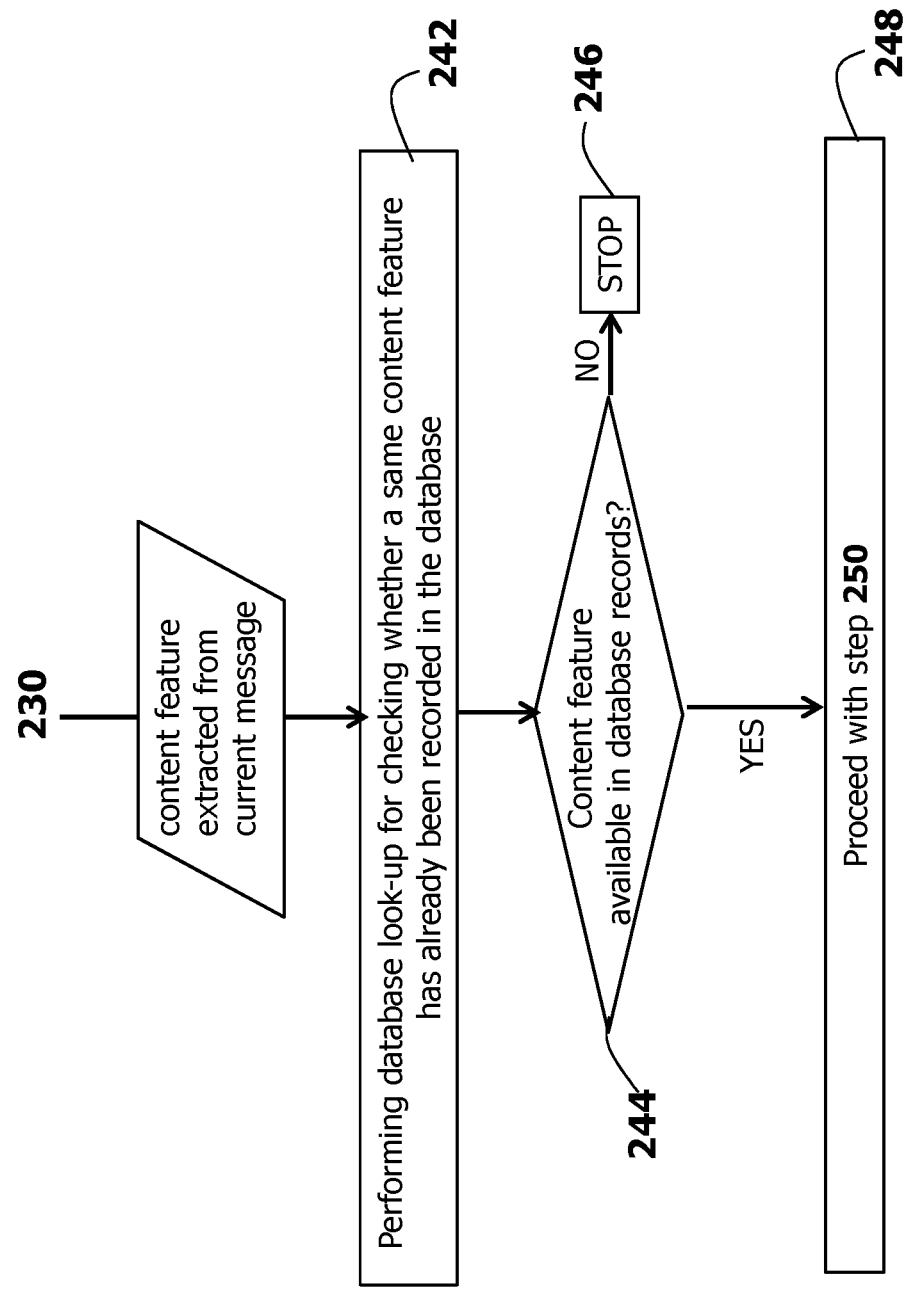
Figure 2C:
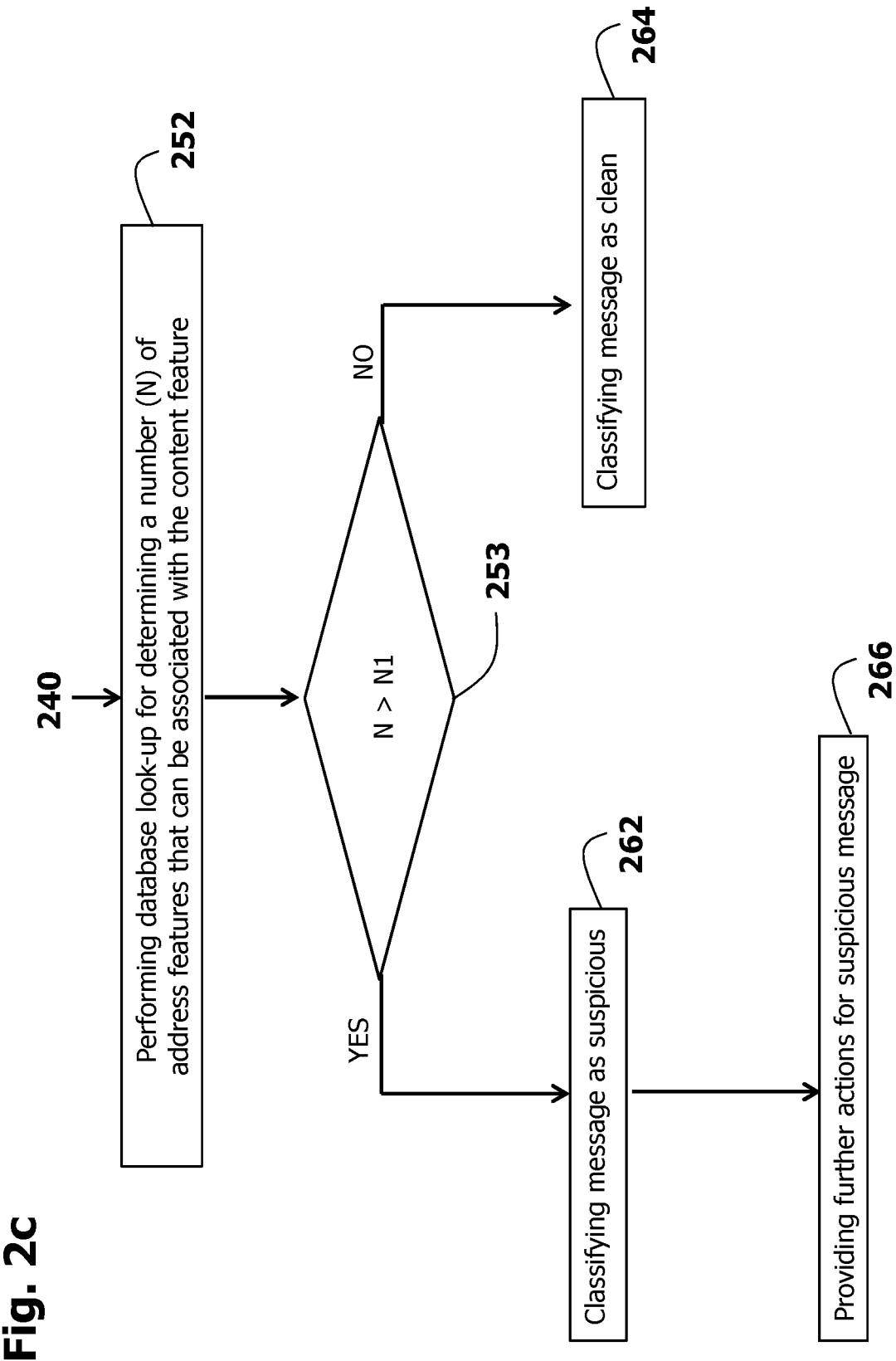

The functionalities of the units 1010 to 1060 are further explained in conjunction with the flow diagrams in FIGS. 2a2c. The flow diagrams illustrate a method of detecting suspicious electronic messages transmitted from a plurality of message senders 110-110m to a plurality of message receivers 120-120k.

The method starts with step 210 (see FIG. 2a), according to which electronic messages 101, 102, 103 transmitted by the plurality of message senders 110-110m are received via interface 1080 by the messaging server 1000. Each message 101, 102, 103 received by the interface 1080 is routed to the analysing unit 1010 for subsequent message analysis.

In a subsequent step 220 the analysing unit 1010 extracts from each received message 101, 102, 103 a message sender feature and a content feature CF of the message. As explained above, the message sender feature may be a hash value (e.g., MD5 hash value) indicative of the message sender address. Further, the extracted content feature CF may be a hash value (e.g., MD5 has value) indicative of the subject line content and/or a message content embedded in or attached to the message. Further, a timestamp ts is provided by the time-stamping unit 1020 for each message, for which a corresponding content feature CF and a related address feature AF have been extracted.

For each considered message 101, 102, 103, the extracted address feature AF and content feature CF as well as the corresponding timestamp ts are fed to the recording unit 1030. In a subsequent third step 230 the recording unit 1030 records the extracted address feature AF and content feature CF along with the corresponding timestamp ts in the database 1060. Since messages 101, 102, 103 are continuously received by the messaging server 1000, corresponding address features AFs and content features CFs along with corresponding timestamps ts are continuously recorded in the database 1060. Therefore, with ongoing time a dataset can be recorded comprising a large number of time-stamped address and content features.

The extracted content features CFs are fed to the determining unit 1040 as well. Upon reception of a new content feature CF extracted from the currently received message 101, the determining unit 1040 starts with determining whether the content feature CF associated with the current message 101 has already been recorded in the database 1060 in the past, i.e., for previously received messages (step 240). That is, it is determined whether database records for the considered content feature CF already exist in the database 1060. If the determining unit 1040 has found that previous records for the same content feature CF exist in the database 1060, the determining unit 1040 further determines how many message senders 110-110m can be associated with this specific content feature CF.

The determining step 240 is further discussed with reference to FIGS. 2b and 2c. FIG. 2b illustrates in the form of a flow diagram the determining algorithm in more detail. The determining unit 1040 performs a database lookup in the first index data structure IDX1 in order to determine whether the same content feature has already been recorded in the database 1060. In general, it is sufficient to limit the look-up for content features CFs to short periods of time in the past because botnet attacks usually generate a large number of messages 101, 102, 103 within short periods. As explained above, a limitation of the look-up to records of the last 10 hours, preferably the last 5 hours, more preferably the last hour should be sufficient in order to obtain sufficient statistics for message classification. In case no identical content feature CF could be found, the algorithm stops at this point (step 246). The method will proceed with a new look-up for a new content feature CF derived from a subsequent message.

If, however, the determining unit 1040 could find an identical content feature record, the determining unit 1040 proceeds with step 250 (see FIG. 2c). That is, the determining unit 1040 performs for the considered content feature CF a second look-up in the database 1060 in order to determine the recorded address features AFs which are related to the considered content feature (step 252). The second look-up is performed in the second data index structure IDX2 which comprises address features AFs in conjunction with content features CFs. Again the look-up can be limited to the features recorded in the near past (e.g., to the last few hours as described above). As a result of the second look-up, a list of different address features AFs is obtained which can be related to the considered content feature CF.

The obtained list is fed to the classifying unit 1050 which classifies the current message 101 on the basis of the address features AFs contained in the list. If the classifying unit 1050 detects that a number N of found different address features AFs (and therefore the number of message senders 110-110m which have transmitted the same content) exceeds a predetermined threshold value N1 (decision 253 in FIG. 2c), the classifying unit 1050 classifies the message 101 as suspicious (step 262) and the current message 101 is subjected to further actions (step 266). Such further actions may comprise tagging the mail as suspicious mail in order to warn the destined message receiver 120-120 k. Alternatively, the current message 101 may be tagged in a specific way so that the current message 101 is filtered out or quarantined by the security unit 1070 arranged downstream the message flow (see also FIG. 1). Still alternatively, the current message 101 may be tagged as spam. The above described message tagging can be performed in the analysing unit 1010 which intercepts the current message 101, upon receiving a corresponding feedback signal indicating that the current message 101 has been found to be suspicious (FIG. 1, dashed arrow).

If however, the number N of found different address features AFs is smaller than or equal to the threshold value N1, the current message 101 is classified as clean (step 264 in FIG. 2c) and no further action is required. In this case the classifying unit 1050 may sent a feedback signal to the classifying unit 1010 indicating that the current message 101 has been found not to be suspicious. The current message 101 can then be routed to the security unit 1070 for an obligatory AV check or directly routed to the destined message receiver 120-120k.

It is noted that the two-staged look-up process described above considerably improves the performance of the present detection method because the first look-up, which is a fast look-up that does not require much computer resources, can be used in order to determine whether the current message 101 carries a new message content or only message content already carried by previous messages. In case the message content is found to be new (i.e., different from previous message contents), it can be assumed that the current message 101 does not form part of a bootnet attack, and thus the algorithm can be stopped before carrying out the more expensive second look-up. On the other hand, if the message content has been found to already exist in the database, it cannot be excluded that the current message 101 is part of such an attack, and the second look-up is required in order to discriminate with a certain accuracy level clean messages from suspicious messages (i.e. spam or malicious messages).

According to one implementation in order to further increase the accuracy of the described method a whitelist may additionally be provided comprising trustworthy message content features, such as corporate logos, which may be part of different messages sent by different trustworthy message senders The method would classify such messages as suspicious if the number of trustworthy message senders sending such messages is greater than the predetermined threshold value. Such erroneous classification can be avoided by comparing the extracted message content features against the content features recorded in the whitelist. If the content feature is known from the whitelist the message will not be classified as malicious.

Figure 3:
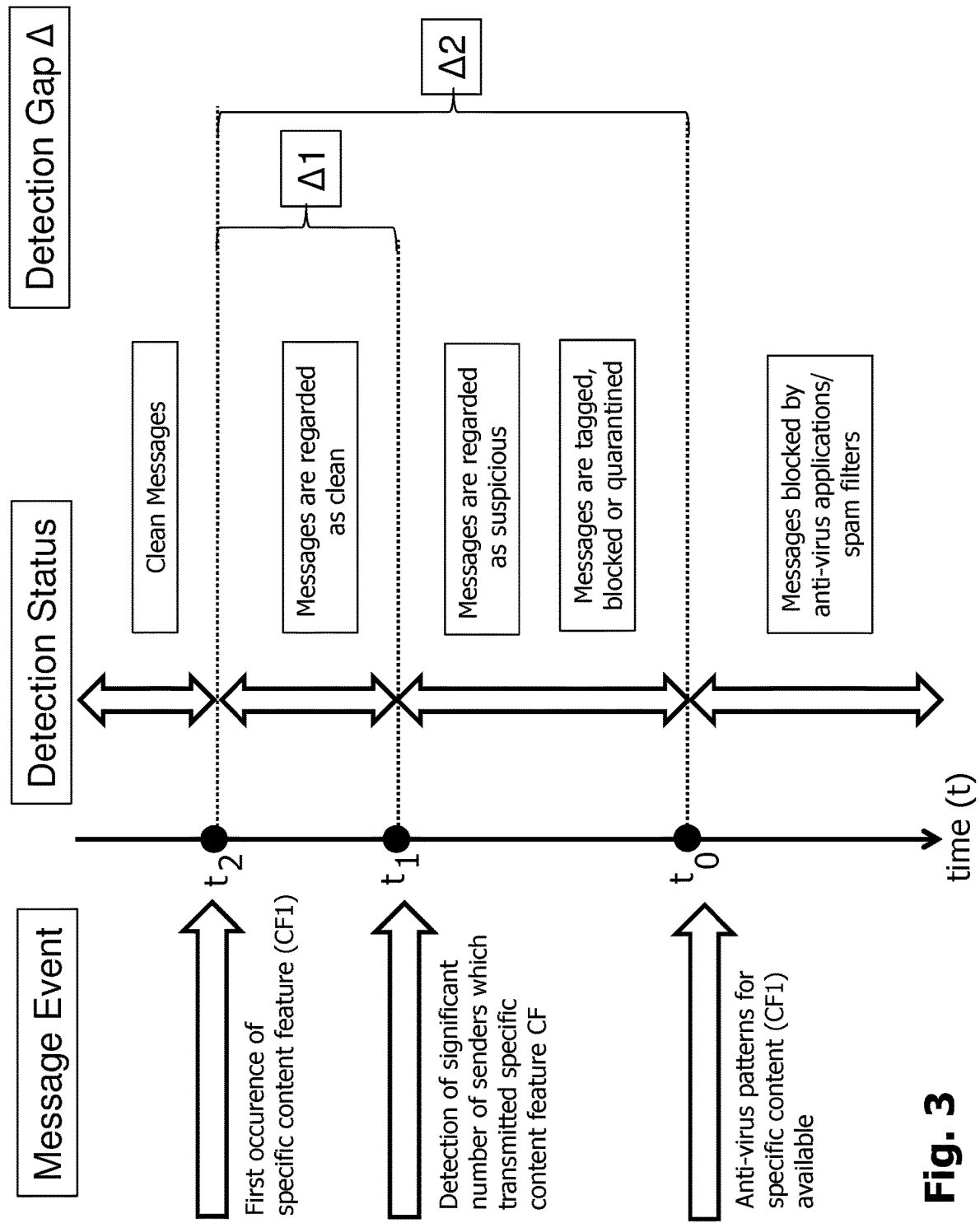
FIG. 3 illustrates a timeline on which the response behaviour of the method of FIG. 2 is compared with the response behaviour of conventional spam and malware detection techniques.

With reference to FIG. 3 the benefit of the above described detecting technique is further discussed. FIG. 3 illustrates a diagram comprising a vertically running timeline, wherein t2 defines a point of time at which a spam message or malicious message carrying a specific content feature CF1 appears for the first time. Since no appropriate AV patterns are available for identify the content as spam or malicious at the point of time t2, the message is regarded as clean.

Starting from t2 the number N of message senders 110-110m that sends messages having the same specific content feature CF1 further increase. At the later point of time t1 the present method detects that the number of message senders responsible for the specific message content CF1 exceeds a predetermined threshold value. Due to the detected significant number of different message senders 110-110m that can be associated with the specific content feature CF1, all messages occurring at points of time later than t1 are classified as suspicious by the present method.

Hence, on the basis of the detected correlation between the specific content feature CF1 and the different message senders 110-110m a new botnet attack can already be detected at t1. Accordingly, with the present method a detection gap Δ1 between first occurrence of a malicious message or spam message and its detection can be kept small. Contrary to the present method, a conventional AV detection technique has to wait for an appropriate AV signature update in order to detect the new threat. Such an update may take some time and a considerable larger detection gap Δ2 between a first occurrence of a malicious message or spam message and its detection is obtained (see FIG. 3).

It is also clear from the above discussion that the present technique can be combined with conventional security techniques, such as conventional AV detection techniques and/or spam filters (see also FIG. 1) so that the best possible protection against botnet attacks can be gained. Moreover, the present detection technique is robust against errors and reliable because it is only based on a few detection parameters, such as the predetermined threshold value N1 and the look-up detection window (i.e., the time period for which recorded content and address features AFs are looked up and taken into account by the detection algorithm).

While the technique presented herein has been described with respect to particular embodiments, those skilled in the art will recognize that the present invention is not limited to the specific embodiments described and illustrated herein. It is to be understood that the disclosure is only illustrative. Accordingly, it is intended that the present invention be limited only by the scope of the claims appended hereto.

The invention claimed is:

1. A method of detecting suspicious electronic messages, wherein the method is performed in a messaging server which is in communication with a plurality of message senders and a plurality of message receivers, wherein the method comprises the steps of:
   receiving electronic messages sent from the plurality of message senders to at least one message receiver;
   extracting from each received message at least one message sender address feature (AF) and at least one message content feature (CF);
   recording the extracted at least one message sender address features (AF) and at least one message content features (CF) in a database;
   determining, on the basis of the message content features (CFs) recorded in the database, whether a specific content feature that can be associated with a current message has already been recorded in the past;
   if the specific content feature has already been recorded in the past, determining, on the basis of the message sender address features (AFs) recorded in the database, a number (N) of message senders that can be associated with the specific content feature; and
   classifying the current message as suspicious if the determined number (N) of message senders that can be associated with the specific content feature exceeds a predetermined threshold value (N1), wherein the predetermined threshold value (N1) is dynamically adjusted,
   wherein time-stamped message sender address features (AFs) and message content features (CFs) are recorded in two separate index data structures, wherein a first index data structure (IDX1) comprises a data set (ts, CF) of time-stamped message content features (CFs) and a second index data structure (IDX2) comprises a data set (ts, CF, AF) of time-stamped message content features (CFs) and message sender address features (AFs), and
   wherein if the current message has been classified as suspicious, the method further comprising at least one of the following steps:
   blocking the current message; and
   subjecting the current message to an anti-virus (AV) analysis.

2. The method according to claim 1, further comprising generating timestamps (ts) and recording the timestamps (ts) along with the extracted message sender address features (AFs) and message content features (CFs) in the database.

3. The method according to claim 2, wherein the recording step further comprises: organizing the time-stamped message sender address features (AFs) and message content features (CFs) into at least one index data structure (IDX1, IDX2).

4. The method according to claim 1, wherein the step of determining whether specific content features has already been recorded in the database comprises:
   performing an identity or similarity check between the message content feature (CF) associated with the current message and the recorded message content features (CFs) in the database.

5. The method according to claim 4, wherein a database look-up is performed in order to determine whether a content feature record identical or similar to the specific content feature already exists in the database for a predetermined time window in the past.

6. The method according to claim 4, wherein if a message content feature record identical or similar to the specific content feature already exists in the database for a predetermined time window, determining how many message sender address features (AFs) can be related to the existing content feature record for the predetermined time window.

7. The method according to claim 5, wherein if a message content feature record identical or similar to the specific content feature already exists in the database for a predetermined time window, determining how many message sender address features (AFs) can be related to the existing content feature record for the predetermined time window.

8. The method according to claim 1, wherein the classifying step further comprises at least one of the following processes:
   tagging the current message as suspicious message; and
   registering the content of the current message as spam or malicious content in a blacklist.

9. The method according to claim 1, further comprising:
   routing the current message to the intended message receiver if the anti-virus (AV) analysis reveals that the message is not malicious.

10. The method according to claim 1, wherein the at least one extracted message sender address feature (AF) is indicative of a sender address or sender address portion.

11. The method according to claim 1, wherein the at least one extracted message content feature (CF) is indicative of an attachment of the message, subject line content of the message, uniform resource locator (URL) comprised in the message and/or portions thereof.

12. A computer program product being stored on a non-transitory computer readable recording medium comprising program code portions for carrying out a method comprising the steps of:

receiving electronic messages sent from the plurality of message senders to at least one message receiver;

extracting from each received message at least one message sender address feature (AF) and at least one message content feature (CF);

recording the extracted at least one message sender address features (AF) and at least one message content features (CF) in a database;

determining, on the basis of the message content features (CFs) recorded in the database, whether a specific content feature that can be associated with a current message has already been recorded in the past;

if the specific content feature has already been recorded in the past, determining, on the basis of the message sender address features (AFs) recorded in the database, a number (N) of message senders that can be associated with the specific content feature; and classifying the current message as suspicious if the determined number (N) of message senders that can be associated with the specific content feature exceeds a predetermined threshold value (N1), wherein the predetermined threshold value (N1) is dynamically adjusted, wherein time-stamped message sender address features (AFs) and message content features (CFs) are recorded in two separate index data structures, wherein a first index data structure (IDX1) comprises a data set (ts, CF) of time-stamped message content features (CFs) and a second index data structure (IDX2) comprises a data set (ts, CF, AF) of time-stamped message content features (CFs) and message sender address features (AFs), and wherein if the current message has been classified as suspicious, the method further comprising at least one of the following steps:

blocking the current message; and subjecting the current message to an anti-virus (AV) analysis.

13. A messaging server for detecting suspicious electronic messages, wherein the messaging server is in communication with a plurality of message senders and a plurality of message receivers, the messaging server being configured to receive electronic messages sent from the plurality of message senders to at least one message receiver, the server comprising:

an analyser configured to extract at least one message sender address feature (AF) and at least one message content feature (CF) from each received message;

a recorder configured to record the extracted at least one message sender address features (AF) and at least one message content features (CF) in a database;

a determiner configured to determine, on the basis of the message content features (CFs) recorded in the database, whether a specific content feature that can be associated with a current message has already been recorded in the past, and if the specific content feature has already been recorded in the past, to further determine, on the basis of the message sender address features (AF) recorded in the database, a number (N) of message senders that can be associated with the specific content feature; and a classifier configured to classify the current message as suspicious if the determined number (N) of message senders that can be associated with the specific content feature exceeds a predetermined threshold value (N1), wherein the predetermined threshold value (N1) is dynamically adjusted, wherein time-stamped message sender address features (AFs) and message content features (CFs) are recorded in two separate index data structures, wherein a first index data structure (IDX1) comprises a data set (ts, CF) of time-stamped message content features (CFs) and a second index data structure (IDX2) comprises a data set (ts, CF, AF) of time-stamped message content features (CFs) and message sender address features (AFs), and wherein if the current message has been classified as suspicious, the classifier further configured to:

block the current message; and subject the current message to an anti-virus (AV) analysis.

14. The messaging server according to claim 13, further comprising a time stamper configured to provide a timestamp (ts) for each extracted message sender address feature (AF) and message content feature (CF).

* * * * *